United States Patent
Hunter et al.

(10) Patent No.: US 6,967,658 B2
(45) Date of Patent: Nov. 22, 2005

(54) NON-LINEAR MORPHING OF FACES AND THEIR DYNAMICS

(75) Inventors: Peter J. Hunter, Auckland (NZ); Poul F. Nielsen, Auckland (NZ); David Bullivant, Auckland (NZ); Mark Sagar, Santa Monica, CA (US); Paul Charette, Valencia, CA (US); Serge LaFontaine, Lincoln, MA (US)

(73) Assignee: Auckland UniServices Limited, Auckland (NZ)

( * ) Notice: Subject to any disclaimer, the term of this patent is extended or adjusted under 35 U.S.C. 154(b) by 825 days.

(21) Appl. No.: 09/888,042

(22) Filed: Jun. 22, 2001

(65) Prior Publication Data

US 2002/0041285 A1 Apr. 11, 2002

Related U.S. Application Data

(60) Provisional application No. 60/214,247, filed on Jun. 23, 2000, and provisional application No. 60/213,304, filed on Jun. 22, 2000.

(51) Int. Cl.$^7$ ............................................. G06T 15/70
(52) U.S. Cl. ....................................... 345/473; 345/646
(58) Field of Search .............................. 345/419, 473, 345/646, 647, 955; 382/215, 276, 302, 308

(56) References Cited

U.S. PATENT DOCUMENTS

| | | | | |
|---|---|---|---|---|
| 5,267,154 A | * | 11/1993 | Takeuchi et al. ............. | 345/473 |
| 5,995,119 A | | 11/1999 | Cosatto et al. | |
| 6,016,148 A | * | 1/2000 | Kang et al. .................. | 345/622 |
| 6,072,496 A | | 6/2000 | Guenter et al. | |
| 6,147,692 A | * | 11/2000 | Shaw et al. .................. | 345/643 |
| 6,163,322 A | | 12/2000 | Lachapelle | |
| 6,188,776 B1 | * | 2/2001 | Covell et al. ............... | 382/100 |
| 6,239,805 B1 | | 5/2001 | Deering | |
| 6,300,960 B1 | * | 10/2001 | DeRose et al. ............. | 345/474 |
| 6,552,729 B1 | * | 4/2003 | Di Bernardo et al. ...... | 345/473 |
| 6,556,196 B1 | * | 4/2003 | Blanz et al. ................ | 345/419 |
| 6,608,631 B1 | * | 8/2003 | Milliron ..................... | 345/647 |

OTHER PUBLICATIONS

Stèphane Valente et al., "Analysis and Reproduction of Facial Expressions for Communicating Clones," IEEE 3$^{rd}$ Workshop on Multimedia Signal Processing, pp. 445–450 (1990).

Jialin Zhong "Flexible Free Animation Using MPEG–04/SNHC Parameter Streams," 1889 International Conference on Image Processing, ICIP 98, vol. 2, pp. 924–928 (1998).

* cited by examiner

*Primary Examiner*—Mark Zimmerman
*Assistant Examiner*—Enrique L. Santiago
(74) *Attorney, Agent, or Firm*—Fish & Richardson P.C.

(57) ABSTRACT

A method and apparatus is disclosed in which one or more standard faces are transformed into a target face so as to allow expressions corresponding to the standard face(s) to be used as animation vectors by the target face. In particular, a non-linear morphing transformation function is determined between the standard face(s) and the target face. The target face animation vectors are a function of the morphing transformation function and the animation vectors of the standard face(s).

18 Claims, 2 Drawing Sheets

NON-LINEAR MORPHING OF FACES AND THEIR DYNAMICS

CROSS REFERENCE TO RELATED APPLICATIONS

This application claims priority under 35 U.S.C. §119(e) to U.S. Provisional Patent Applications Nos. 60/213,304 filed Jun. 22, 2000 and 60/214,247 filed Jun. 23, 2000, the disclosures of which are hereby incorporated by reference.

STATEMENT REGARDING FEDERALLY SPONSORED RESEARCH OR DEVELOPMENT

N/A

BACKGROUND OF THE INVENTION

In computer graphics providing realistic human facial animation is a difficult problem. The human face is one of the most studied and scrutinized parts of the body. In addition, we as humans have the ability to read an expression and to identify individuals and expressions of emotions based on facial communicative signals, and to know when an expression is false from the slightest deviations.

The shape of a computer generated face can be approximated by a set of geometric primitives such as polygons or curvilinear elements such as polynomials, splines, or NURBS (Non-Uniform Rational B-Splines). These geometric primitives can be described in terms their position in a predetermined set of spatial coordinates using the two or three-dimensional coordinates of their vertices or end points. In addition, other data such as derivatives or normals of these surfaces or functions may also be used.

These vertices are typically collected and combined into a matrix A in which the row vectors of the matrix A represent each image of the face, and the column vectors represent the various locations in two or three dimensions of the vertices used to define a face or object. In general if each of the vertices are defined in three dimensions, then for k vertices of a face or object, there will be 3*k column vectors.

In the instance in which the face is moving, e.g., translating or rotating in space, or deforming, e.g., the relative displacement of the vertices changes relative to a body centered coordinate axis, then the vertices in the matrix are a function of time, t, or sample, k.

Each row of vectors comprising the matrix A could be an emotion or facial expression displayed by an actor for a model face. All of the row vectors in a particular matrix A therefore taken together could represent a range of emotions and facial expressions for that model face. A subset of these various row vectors could be selected, weighted appropriately, and combined together to form a composite face having complex facial expressions or dynamics that could be processed and displayed by a computer system.

However obtaining a complete set of expressions and facial dynamics for a particular face is often not possible. The person whose face is desired may not be capable of generating the necessary facial expressions, or may not be available to generate the necessary facial expressions. The process of collecting the data is also time consuming. In addition, the process of collecting data can require specialized equipment such as a 3D digital motion-capture system. Such a system can include a video camera or single two-dimensional (2D) image that has been converted to a 2D or 3D computer graphics model.

Therefore, it would be advantageous if dynamic animation data for a model face could be morphed or deformed to represent a static geometry or an image taken photograph so as to avoid the costs of collecting and analyzing facial data for the static object or photograph.

BRIEF SUMMARY OF THE INVENTION

A method and apparatus are disclosed for providing displayable expressions and animations for a target head by a non-linear morphing function that is derived using a standard head model and the target model. In general, to reduce the number and complexity of the computations involved, the vectors representing expressions are only a subset of the head vertices that move dynamically with facial expressions. A non-linear morphing function is determined that will morph a geometric model of a standard head to a geometric model of a target head. This morphing function is used to transform the orthogonal basis of the standard head model into anew basis of the target head model. Animation vectors of the standard model can then be combined with the new orthogonal basis of the target head model to create a sequence of animation poses.

In one embodiment, the non-linear transformation is determined by placing the standard head model within a finite element mesh and deforming the finite element mesh, thus deforming the standard head model. The target head may contain marker locations that correspond to individual vertices on the standard head. Using a least squares optimization technique, the standard head model is deformed until the difference between the vertices of the standard head model and the marker locations have minimized the least square optimization function S.

In another embodiment, the parameters of a non-linear function are adjusted until the difference between the vertices of the standard head model and the marker locations have minimized the least square optimization function S. The non-linear function may be a polynomial function, or a rational polynomial function, and in particular a Chebychev rational polynomial function.

In another embodiment, the non-linear morphing function is determined by a linear combination of a plurality of standard head models. From this plurality of standard head models a new sub-set is created by an SVD analysis as described below, to create new static heads. In this instance, the emotions from a "parent" standard head are morphed to all the sub-set of static heads thus created. The target face is then described by a linear combination of the original standard head model and the plurality of morphed standard head models. The weights associated with the various standard head models are then used with the orthogonal basis matrices associated with the various standard head models to form an orthogonal basis matrix for the target head. Animation vectors of the original standard head model may then be used to linearly combine the orthogonal basis matrix of the target head to create target head animation vectors.

In another embodiment, the non-linear morphing function is determined by a linear combination of a plurality of standard head models, wherein a first standard head model is morphed to provide a plurality of other standard models using the basis of the first standard model. However, the desired expression is to be taken from a second standard head model unrelated to the first standard head model, i.e., the second standard head model was not morphed from the first. In this case, after the proper linear combination of the first standard head model and the plurality of standard head models morphed therefrom, a morphing process is used to morph the second standard head into the target head, using any of the morphing techniques outlined above. The morphed orthogonal basis of the second standard head model is combined with an un-morphed expression vector of the second standard head model and the orthogonal basis of the target head to provide an animation vector for the target head.

In another embodiment, when the pose of the standard head does not correspond to the pose of the target head, i.e., the target head includes an emotive expression, the standard head is combined with one or more expressions corresponding thereto, prior to a morphing function being determined. In this embodiment, the non-linear morphing function will be an optimization beginning from an emotive face, i.e., an offset face, and not a neutral face. The various weights that are used to form the offset face are also used in the optimization.

BRIEF DESCRIPTION OF THE SEVERAL VIEWS OF THE DRAWINGS

The invention will be more fully understood by reference to the following Detailed Description of the Invention in conjunction with the drawings of which.

DETAILED DESCRIPTION OF THE INVENTION

Figure 1:
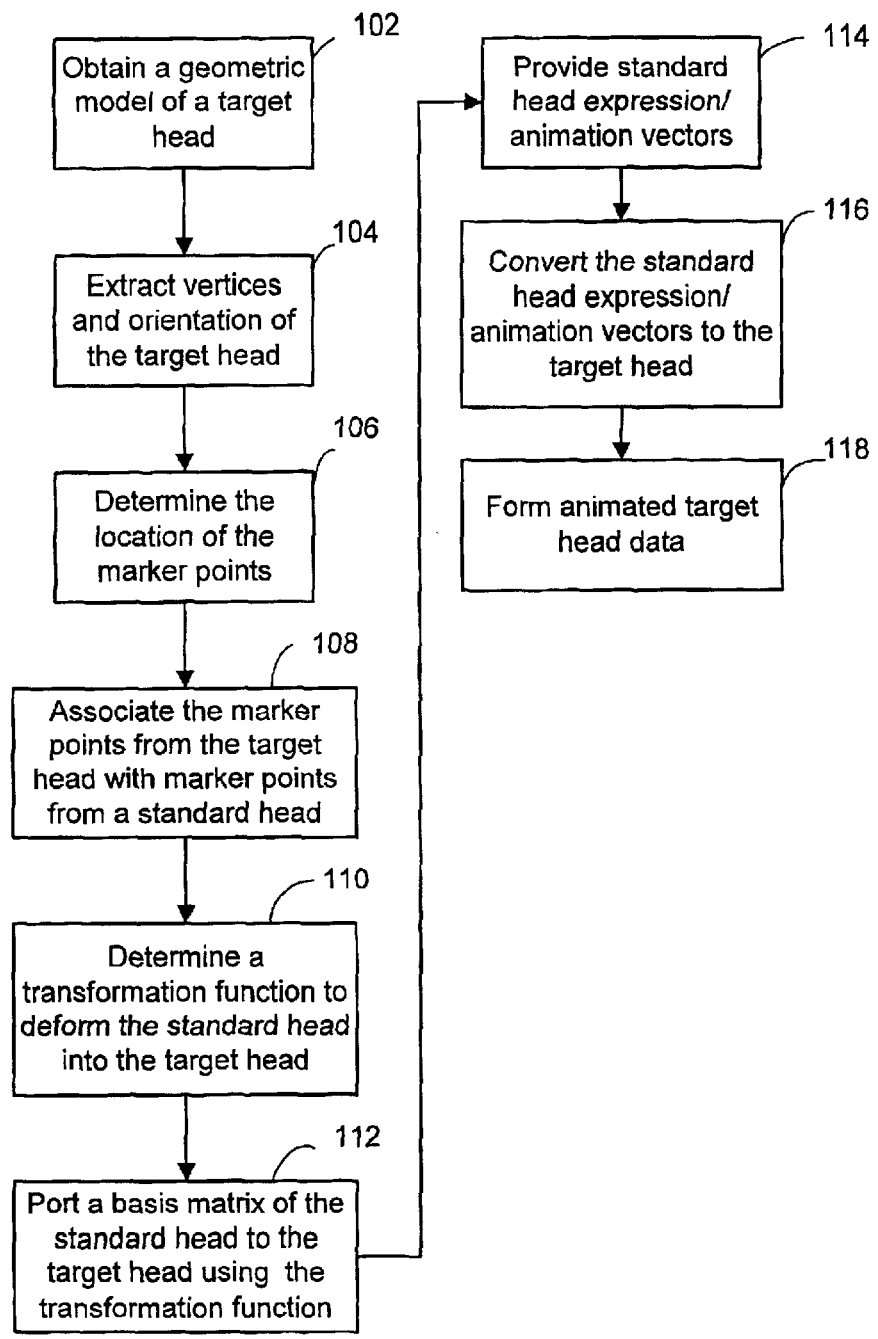
FIG. 1 is a block diagram depicting a method for executing the non-linear morphing of faces and their dynamics described herein.

FIG. 1 depicts a method in accordance with the present invention for morphing a standard head model into a target head model using non-linear functions. The non-linear function is used to port standard expression poses corresponding to the standard head model to target expression poses. This allows for the simulation of a believable set of expressions for the target face.

In particular, a geometric model of a target head containing three-dimensional (3D) data is obtained, as depicted in step 102. The target head may be obtained from a user or a customer seeking to create a series of animated images of the target head. The 3D data are typically the 3D coordinates of the surfaces of the face and head. The 3D data may be acquired using optical or mechanical techniques, inferred from one digital picture or estimated from two or more digital pictures acquired from a digital still or video camera or a single digitized two-dimensional (2D) photograph that has been converted to a 2D or 3D computer graphics model. A previously stored file of image or video data may also be used to generate the necessary 3D image data. This representation is typically referred to as a static model since there is no motion capture involved and therefore does not include dynamic sequences.

The standard head model dynamics can be acquired in a variety of ways. In one embodiment, actors representing a range of ages, gender, ethnicity, and other features are recorded using a 3D motion capture system or a laser scanning instrument. The actors provide both a neutral face, i.e., a neutral facial expression showing no emotion or other dynamic features, and a series of emotional expressions and dynamic features. The emotional expression may include a smile, a wink, or a frown, and the dynamic features may include various facial expressions used when talking. In addition, combinations of the standard head models, or morphing of the standard head models may be used to create additional standard head models.

In another alternative embodiment, a physiologically based mathematical model of a face could be constructed so as to compute various facial expressions or deformations based upon input stimuli to the various physiological structures such as muscles, nerves, and joints. The model could be used to compute various facial expressions directly and as such could be used to generate facial expressions or object images.

The models could be static, i.e. when the shape of the object (or location of vertices) are not dependent on previous history (previously assumed shapes) or dynamic when the shape depends on previously assumed shapes in time or how an external variable has been evolving in time. Models can also be linear or non-linear and time invariant or time-varying. These mathematical models can also be expressed in many ways, such as a state-variable model, a finite-element model or non-parametric representation. Models are typically predicting changes in the location of vertices or reducing their degrees of freedom. One example could be the stimulation of a muscle group leading to a deformation of a face (smile, wink, etc.). In the case of a non-linear state-space variable one could represent the deformation of the face in response to a nerve stimulation $S_k=S(t_k)$, $t_k=\{0, T, 2T, \ldots nT\}$:

$$A_i=G(S_{i-1}, S_{i-2}, \ldots S_0) \qquad \text{Eq. 1}$$

The static 3D coordinates for a set of vertices is obtained and extracted from the static model as is the orientation of the head, i.e., rotation and translation of the head with respect to a predetermined set of coordinate axes, as depicted in step 104. The standard head model is placed within a finite element cube that includes a plurality of vertices, such that the finite element cube includes a plurality of smaller sub-cubes. Each of the smaller sub-cubes therefore contains a portion of the standard face model. Other shapes of the finite element mesh and sub-structures may be used as well. For example other polygonal or geometric shapes used in finite element analysis could be used. The shape of the finite element mesh and the sub-structures can be changed depending on the type of deformations needed.

Predetermined key points, or markers, are located on the target head model, as depicted in step 106 and are associated with the corresponding markers located on the standard head model, as depicted in step 108. In some instances there may not be a one-to-one correspondence between the markers located on the target face and the vertices located on the standard face. For example, the cheeks are typically a smooth surface and it is difficult to locate a marker point on the target head model and the corresponding vertex on the standard head model. In such instances the comparison is made by defining how close a marker is to a feature such as a surface defined by a small neighborhood of points, and by defining a marker on the standard face by projection on a subspace (surface or curve) defined by the neighboring points. In particular, a line is projected from the camera position to the 2D picture plane. The intersection of the projected line with the surface or curve is the equivalent position of the marker position defined on the target face. In some instances it may be necessary to further constrain the location of the intersection. For example certain points on the body, such as the tip of the chin and the tip of the nose, need to be aligned in one or more axes. As such the position of one of these points may be constrained in relation to the other. These markers can include, among other points, the tip of the nose, the tip of the chin, the ears, the eyes, the eye contours, the nose contours, the mouth contours, and the chin contours.

In another embodiment, the target head model may be created from a combination of a plurality of standard head models selected to approximately match the target head model. In this embodiment there will be a one to one matching between the vertices of the created standard head model and the target head model.

The parameters of a deformation function are determined, as depicted in step 110. The deformation function and the corresponding parameters are selected to deform the surface contours and features of the standard head model to match the surface contours and features of the target head model while minimizing predetermined error criterion. In one embodiment, the deformation function is selected to reposition the vertices, or control points, of the various smaller sub-cubes thereby deforming the portions of the standard head model contained therein. The repositioning of the control points in a particular sub-cube is designed so that the surface and features of the particular portion of the standard head model contained in the particular sub-cube conforms to the surface and features of the corresponding portion of the target face, within a predetermined error criteria. Thus, by properly shifting the control points of the various sub-cubes within the finite element cube, the standard face is morphed into the target face.

The deformation function, i.e., the new transformed coordinates of the control points, are also used to interpolate the vertices of the standard head model located between each of the key points or markers in order to conform to the target head model. The interpolated values will be located near the surface defined by the key points in a manner so as to minimize a predetermined error function.

In the simplest embodiment, when vertices in the standard head and target head have a direct correspondence, a least square optimization process is used to determine the parameters of a suitable deformation function, wherein the following objective function, S, is minimized:

$$S = \sum_{n=1}^{N} [(x^n - X(\xi_1^n))^2 + (y^n - Y(\xi_2^n))^2 + (z^n - Z(\xi_3^n))^2] \qquad \text{Eq. 2}$$

where $\xi_1^n$ is the material x coordinate in the host mesh of node n of the standard face, $\xi_2^n$ is the material y coordinate in the host mesh of node n of the standard face, and $\xi_3^n$ is the material z coordinate in the host mesh of node n of the standard face. In addition $X(\xi_1^n)$ is a parametric equation for the X vertices, $Y(\xi_2^n)$ is a parametric equation for the Y vertices, and $Z(\xi_3^n)$ is a parametric equation for the Z vertices and are of the form:

$$X(\xi_1^n) = \sum \Psi_1^i(\xi_1^n) * X_i; \qquad \text{Eq. 3A}$$

$$Y(\xi_2^n) = \sum \Psi_2^i(\xi_2^n) * Y_i; \qquad \text{Eq. 3B}$$

$$Z(\xi_3^n) = \sum \Psi_3^i(\xi_3^n) * Z_i \qquad \text{Eq. 3C}$$

where $X_i$, $Y_i$, and $Z_i$, are the shifted x, y, and z coordinates of the control points of the particular sub-cube, and $\Psi_1(\xi)$, $\Psi_2(\xi)$, and $\Psi_3(\xi)$, represent an interpolation function such as a B-Spline, Hermite polynomial, NURBS, or another predetermined function used to interpolate the surface within the sub-cube. In another embodiment, an expansion of trigonometric or exponential functions could be used. Accordingly, $X(\xi)$, $Y(\xi)$, and $Z(\xi)$ represent the calculated spatial position of the points of the deformed surface of the standard head model by interpolating the host mesh.

In the more general case where markers on the target head are obtained from 2D digital photographs, or when there is no direct correspondence between vertices on the host mesh and the target mesh, the objective function is more complex, and can include constraints plus additional weighting or confidence parameters. In the case of markers obtained from a 2D photograph, the objective function, S, could also include an estimation of one or more additional parameters. These additional parameters may include the camera parameters, such as the distance to the subject and the focal length of the camera. In addition, these additional parameters may include the subject head orientation parameters (roll, pitch, and yaw). The distance of the projected points in the photographic plane are then determined in a least square manner.

In another embodiment, the parameters of a deformation function are determined, as depicted in step 110, in which the coefficients of a polynomial or other function are determined to provide a morphing function that will directly calculate the new positions of the various points of the surface of the standard face model to the target face model and minimize a selected error function.

In this embodiment, a least squares optimization process is used to determine the parameters of a predetermined deformation function that will minimize the square of the difference between the target points ($x^n$, $y^n$, $z^n$) and the parametric functions having parameters σ and $\xi^n$. In this instance, σ is a vector of coefficients of a polynomial function selected as the deformation function, and $\xi^n$ is the coordinate position of the corresponding point in the standard face model, wherein:

$$S = \sum_{n=1}^{N} [(x^n - X(\sigma_x, X^n, Y^n, Z^n))^2 + \qquad \text{Eq. 4}$$
$$(y^n - Y(\sigma_y, X^n, Y^n, Z^n))^2 + (z^n - Z(\sigma_z, X^n, Y^n, Z^n))^2]$$

where X, Y, and Z are parametric equations for x, y, and z coordinates respectively. These equations have first and second derivatives with respect to the vertices positions of the target positions.

Eq. 4 is solved according to known methods of solving least squares optimization problems. The resulting function $X(\sigma, \xi_1^n)$, $Y(\sigma, \xi_2^n)$, $Z(\sigma, \xi_3^n)$ are typically non-linear polynomial functions. In particular, the functions $X(\sigma, \xi_1^n)$, $Y(\sigma, \xi_2^n)$, and $Z(\sigma, \xi_3^n)$ are rational polynomial functions and advantageously can be Chebychev polynomials. Chebychev polynomials, as is known, provide a maximally steep transition for a given polynomial order. In another embodiment, an expansion of trigonometric or exponential functions could be used. Alternatively, the parametric equations $X(\sigma, \xi_1^n)$, $Y(\sigma, \xi_2^n)$, and $Z(\sigma, \xi_3^n)$ can be NURBS, Non-Uniform Rational B-Splines.

Once deformation functions has been determined, the target face basis, M', can be determined by porting, or transforming, the standard face basis M to the target face, as depicted in step 112. In general the target face basis, M', is a function of the standard face basis M and the deformation function. In order to transform the basis vectors of the standard face model to the target face model, an eigensystem decomposition of the standard face model is first performed. An eigensystem decomposition of a matrix, A, consisting of vertex data can be performed using a singular value decomposition as described in the patent application Ser. No. 09/882,718 entitled, Basis Functions of Three-Dimensional Models for Compression, Transformation, and Streaming filed Jun. 15, 2001, An eigensystem decomposition performed by a singular value decomposition will transform an data matrix A into $A=UWV^T$, where W contains the singular values of A and $WV^T$ form a basis M of the modes of the matrix A. In general all the singular values will contain the mean of the matrix A that is given by:

$$M_0 = \frac{1}{k}\sum_{i=1}^{k} A_i^T \qquad \text{Eq. 5}$$

where $A^T_i$ is the row vector corresponding to a frame of the data stored in the matrix A. Alternatively, $M_0$ could be any other face $A_i$. As such, prior to the eigensystem decomposition, the mean of the matrix A, $M_0$, is removed from each element of the matrix A. If A is an m by n matrix, with m>n there will be at most n singular values. The W matrix is a diagonal matrix containing the singular values in linear order in decreasing value. Accordingly, only the first r singular values will be large enough such that the basis vector $M_i$, formed from the combination $WV^T$, contains a significant information content. Thus, the basis M formed by $WV^T$ will contain useful information only in the first r by r rows and columns. Accordingly, by truncating the number of singular values used to those having a value greater than a predetermined threshold, the basis M of the matrix A can be reduced to an m by r matrix. Each column vector of M remaining after the truncation of the W matrix forms an eigenface of the corresponding data matrix, A. In particular, the $i^{th}$ eigenface can be formed from the $i^{th}$ column vector of M by adding the value of $M_0$ determined in Eq. 5.

In one embodiment, the eigenfaces are computed by first computing $A_i'=G(\sigma,Ai)$, and the procedure described above for an eigenstructure decomposition of the matrix $A_i'$. In general the function $G(\sigma,Ai)$ can be difficult to calculate efficiently given the size of the matrices used and the complexity of the function itself. Accordingly, it is advantageous to find other methods to calculate the eigenfaces or to represent animations. In one embodiment, the eigenfaces determined for the matrix A corresponding to the standard face model are transformed using the non-linear function $G(\sigma,X'',Y'',Z'')=\{X(\sigma_x,X'',Y'',Z''), Y(\sigma_y,X'',Y'',Z''), Z(\sigma,X'',Y'',Z'')\}$ determined above in Eq. 3A–3C or Eq. 4. In particular the $i^{th}$ eigenface of the standard face model is converted into the $i^{th}$ eigenface of the target face model according to:

$$V_i'=G(M_0+V_i) \qquad \text{Eq. 6}$$

where $V_i'$ is the $i^{th}$ basis vector of the target face model. A basis matrix M' is formed from the column vectors, $M=\{V_i'\}$. To form the eigenfaces of the matrix, A, corresponding to the target face model the mean, $M_0'$, of the matrix A corresponding to the target face is first computed as $M_0'=G(M_0)$. This value is added to each of the elements in the matrix M'.

In another embodiment, if a standard face model exists having a set of facial characteristics that is similar to a target face model in terms of the age, gender, features, and ethnicity, the two faces may be similar enough so that the difference between the two shapes is a delta on the order of the difference between $M_0'$ and $M_0$. The target image basis, M', can be approximated by adding $M_0'$ to each element in the matrix M. Due to the small size of the change in the basis matrix, the weighted row vectors $U_i$ which correspond to the animation frames of the standard face model can be used with the new basis M' to form expression or emotion sequences or sequences of visemes.

If there is not a close correlation between the target face and the standard model, the function $G(\sigma,\xi'')$ must be solved for the new basis matrix M'. As discussed above, this may be a computationally inefficient calculation. In an alternative embodiment, a Taylor Series Expansion can be used to approximate the function as:

$$G(\xi) = G(\xi) + \frac{\partial G(\xi)}{\partial \xi} \cdot \delta\xi + \ldots \qquad \text{Eq. 7}$$

such that $$M'_0=G(M_0)$$

$$M_i' = \frac{\partial G(\xi)}{\partial \xi} \cdot M_i$$

where X, Y, and Z are defined with regard to Eq. 3, and $\xi_1$, $\xi_2$, and $\xi_3$, are the variables describing the x, y, and z axis of the particular sub-cube of the finite element mesh. In this case, the row vectors $V_i'$ form the eigenface matrix M'. The animation vectors $U_i$ corresponding to the standard face model are provided, as depicted in step 114, and are used to port, or transform, the standard head animation vectors to the target head, as depicted in step 116 by:

$$A_i=U_i^*M' \qquad \text{Eq. 8}$$

where $A_i$ is the image data corresponding to a frame of animation of the target face model, as depicted in step 118.

In another embodiment, the morphing function is determined using a linear combination of two or more weighted standard faces where one face is a "parent" standard face from which its emotions have been morphed to the others, i.e., an original standard face that includes a plurality of expressions. These expressions are linear combinations of the various poses of the many standard faces and the $i^{th}$ expression would be represented by a row vector $U_I$ including the various weights of the expressions. The other standard faces are a plurality of standard faces that have been created or acquired. Each of the various faces can be weighted by an individual scale factor $\alpha_1, \alpha_2, \alpha_3, \ldots \alpha_n$. In this embodiment, various linear combinations of the parent standard face and the plurality of expressions from other standard faces are used to create a new face that is as close as possible to the target face. A suitable norm may be used to define what "as close as possible" is.

This procedure is typically ill-defined, and a better approach consists in applying an SVD procedure to derive from the plurality of standard faces a much smaller subset of linearly independent eigenfaces from which any parent face in the selected subset can be closely reproduced through linear combinations of the set. An expression can be ported, i.e., morphed, from any of the parent faces to the linear combination face. These "eigenemotions" can be combined in the same manner as the corresponding eigenfaces to form a new expression for the target face.

In general, if there are k standard faces, the SVD decomposition will provide k+1 orthogonal basis matrices $F_i$, where i=1,2,3, ..., k+1. These orthogonal basis matrices are typically the same dimension as the data matrix that was used to generate them, i.e., m by n where m>n. These orthogonal basis matrices may be reduced to a rank r, and hence to an m by r square matrix by removing the columns of the orthogonal basis that do not contain significant portions of information related to the images. Each of the orthogonal basis matrices is then scaled by the same scale factor of the corresponding image matrix determined above, such that the new basis matrix of the target face is given by:

$$M_T = \sum_{i=1}^{n} \alpha_i * M_i \qquad \text{Eq. 9}$$

where $M_T$ is the orthogonal basis of the target face, the $\alpha_i$ are the scale factor determined above, and $M_i$ is the orthogonal basis matrix of the $i^{th}$ standard face. The expressions of one of the parent face is used and morphed to all of the other independent eigenfaces. To create displayable expressions for the target face, the expressions $U_i$ of the parent face are combined with the new orthogonal basis matrix of the target face to form animation vectors $U_i'$ as:

$$U_i' = U_i \cdot \sum_{i=1}^{n} \alpha_i * M_i. \qquad \text{Eq. 10}$$

In another embodiment, there may be first and second standard faces in which the first standard face is a parent standard face having a plurality of child standard faces. A target face may be developed as a linear combination of the first standard face and the plurality of expressions described above. In this embodiment, it is desired to use an expression of the second standard face. The second standard face is then morphed into the target face using any of the morphing techniques described above. Because the target face is the linear combination of the first standard face and the plurality of child standard faces, it is the geometric equivalent of the second standard face. Since the two faces are the geometric equivalent the two have the same vertices, albeit at different coordinates. Accordingly, there is no need to use the standard markers as described above. Rather, the morphing is accomplished using the actual vertices data with whatever technique is used. If the orthogonal basis of the target face is given by $M_T$, the target basis of the second standard face is given by $M_S$, and the expression vector of the second standard face is given by $U_i$, then the expression, $U_I'$, for the target face is given by:

$$U'_i = U_i \cdot M_S \cdot (M_T)^{-1}. \qquad \text{Eq. 11}$$

In another embodiment, the target face may have an emotive expression displayed thereon. In this embodiment, morphing from a neutral expression standard face to an emotive target face can result in exaggerated expressions being displayed on the target face. For instance, if the target face included a smiling expression, morphing from a neutral standard face would result in a smile. Adding a smile to the target face could result in an extremely un-natural exaggerated smile. Similarly, adding a sad expression could result in a neutral expression. To avoid this, prior to any other processing, the standard face is linearly combined with one or more weighted expressions associated therewith to create a similar or equivalent expressions. The various weights are then used throughout the subsequent processing as offset set points.

It should be appreciated that the above process steps can be performed by directly by hardware, e.g., by a Filed Programmable Gate Array (FPGA) or the like. Similarly, the above process steps can be performed by software, stored in a memory, and executed by a microprocessor or other computing processor. Each step can be an individual subroutine, object, or other programming entity. In addition, a user can provide a photograph to be processed that is scanned etc., or can be provided on a computer readable medium or over a computer network such as the World Wide Web or the Internet. Similarly, the resulting animation vectors can be provided on a computer readable medium or over a computer network such as the World Wide Web or the Internet.

Figure 2:
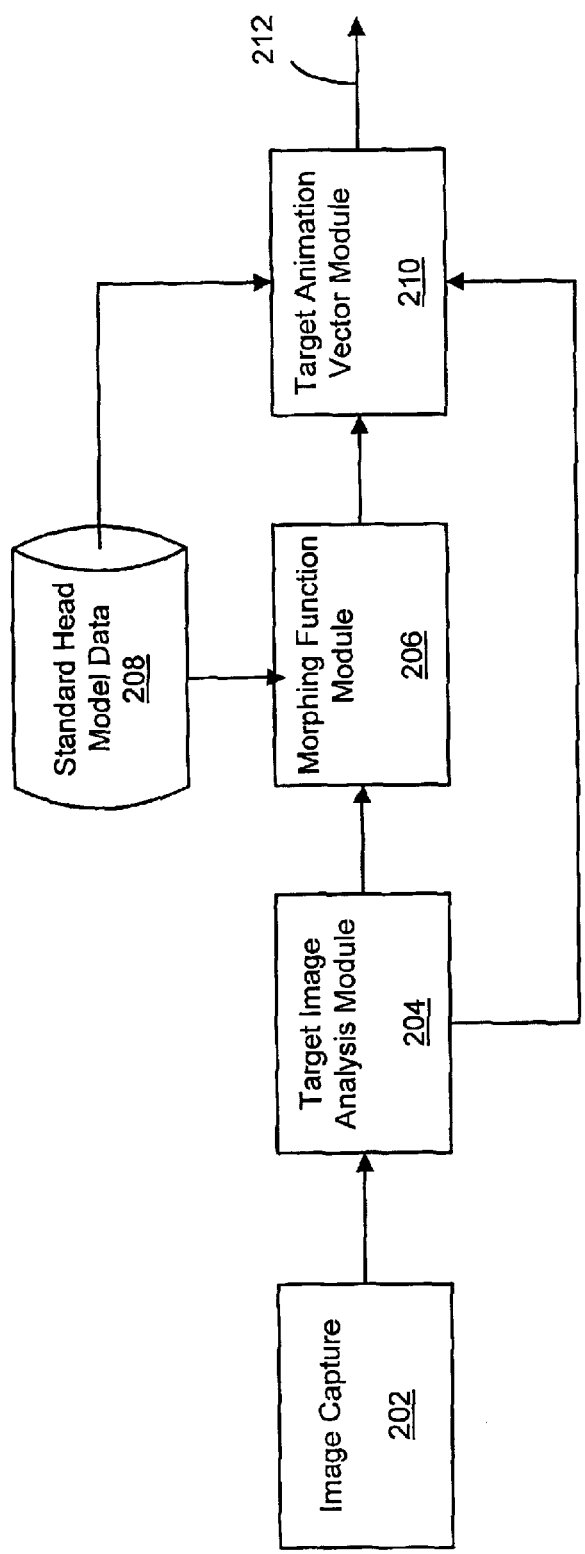
FIG. 2 is a block diagram of a video streaming system in accordance with the method described in FIG. 1.

FIG. 2 depicts an apparatus consistent with the above described methods. In particular, the apparatus 200 includes an image capture module 202 that provides digital image data as described above with respect to step 102. The digital image data can be provided by a customer or user to a service provider, i.e., an organization or individual who will process input images and provide as an output animated image data of the subject of the input image. Alternatively, the digital image data can be obtained by the service provider directly by taking 3D motion images of the subject. The digital image data is provided to the target image analysis module 204. The target image analysis module extracts the vertices and orientation data, as described with respect to step 104 above, and in addition, can provide marker locations as well. The extracted data is then provided to the transformation matrix module 206 along with the standard image data from the standard image data storage module 208. The transformation matrix module 206 provides the morphing transformation between the target head and the standard head using one of the techniques described above with respect to step 110. If the technique selected requires that marker points be associated with particular vertices data, as described above with respect to step 108, that can be performed in this module as well. The morphing transformation is then provided to the animation vector module, 210 along with the orthogonal basis matrix of the target head from the target image analysis module and the orthogonal basis of the standard head from the standard head data storage module 208. The animation vectors can be provided to the user on a computer readable medium such as a magnetic disk, CD-ROM, or DVD disk. Alternatively, the animation vectors can be provided across a computer network such as the World Wide Web, the Internet, or other data network.

Those of ordinary skill in the art should further appreciate that variations to and modification of the above-described methods and apparatus for the above described image processing system may be made without departing from the inventive concepts disclosed herein. Accordingly, the invention should be viewed as limited solely by the scope and spirit of the appended claims.

What is claimed is:

1. A method for providing animation to a target head model, the method comprising the steps of:
  receiving target head image data including a plurality of target head vertices data including a location data for each of the plurality of head vertices data;
  providing standard head image data including a plurality of standard head vertices data including a location data for each of the plurality of standard head vertices data;
  associating a plurality of standard head marker locations on the standard head model to a corresponding one of a plurality of target head marker locations on the target head model, wherein each standard head marker is one of a subset of the plurality of standard head vertices data, and each target head marker is one of a subset of the plurality of standard head vertices data;
  determining a transformation for morphing the standard head to the target head, wherein the morphing function is determined using a least squares optimization function of a preselected norm of the difference between a predetermined function of the subset of the plurality of standard head vertices data and the corresponding subset of the plurality of target head vertices data;

providing an expression vector including expression image data corresponding one or more images corresponding to an expression to be displayed on the standard head; and determining a target expression vector including target expression image data as a function of the morphing function and the expression data, wherein the target expression image data is displayable on the target face.

2. The method of claim 1 further including the step of displaying the target first image data.

3. The method of step 1 wherein the preselected norm is a Euclidean norm.

4. The method of step 1 wherein the preselected norm is the sum of the squares of the predetermined function and the subset of the plurality of target head vertices.

5. The method of step 1 wherein the preselected function is a polynomial.

6. The method of step 1 wherein the preselected function is a NURBS.

7. The method of step 1 wherein the preselected function is a rational polynomial.

8. The method of step 8 wherein the rational polynomial is a Chebychev polynomial.

9. The method of step 1 wherein preselected function is an expansion or trigonometric functions.

10. The method of step 1 wherein preselected function is an expansion of exponential functions.

11. The method of claim 1 wherein the step of determining a target expression matrix includes:

transforming the plurality of standard expression vertices data into a plurality of target expression vertices data by applying the predetermined function to the plurality of standard expression vertices data.

12. The method of claim 1 wherein the standard head image data includes a standard head basis matrix and a standard head mean value and wherein the expression matrix includes a standard expression basis matrix and a plurality of animation vectors that when multiplied by the standard expression basis matrix provides the standard expression image data, the step of determining a target expression matrix includes:

transforming the standard head basis into a target head basis matrix by applying the predetermined function to the standard basis matrix;

subtracting the standard head mean value from the target head basis matrix forming a modified target head basis matrix;

multiplying the modified target head basis by at least one animation vector to provide target expression image data.

13. A method for providing target expression image data for use with a target head image data model, wherein the expression image data corresponds to one or more images corresponding to an expression to be displayed on a standard head, wherein said expression image data includes a plurality of expression vertices data including a location data for each of the plurality of expression vertices data, wherein the standard head image data includes a plurality of standard head vertices data including a location data for each of the plurality of standard head vertices data, wherein the standard head image data is anthropomorphically mapped into the target head image data model, the method comprising the steps of:

providing the target head image data including a plurality of target head vertices data including a location data for each of the plurality of head vertices data;

associating each of a subset of the plurality of target head vertices data with a corresponding one of the plurality of standard head vertices data;

determining a transformation to transform the surface and features of the standard head to the surface and features of the target head, wherein the transformation is determined using a least squares optimization function of a preselected norm of the difference between a predetermined function of the subset of the plurality of standard head vertices data and the corresponding subset of the plurality of target head vertices data;

providing a plurality of target expression image data as a function of the warping function and the standard expression image data, wherein the target expression image data is displayable on the target face;

providing a mask to insert a predetermined portion of the target emotion image data into the first head image data; and creating a target head expression image data by inserting the predetermined portion of the target expression image data into the target head image data using the mask.

14. The method of step 13 wherein the target image data and the target expression matrix are provided on computer readable medium.

15. The method of step 14, wherein the computer readable medium is a magnetic disk.

16. The method of step 14, wherein the computer readable medium is an optical disk.

17. The method of step 14, wherein the computer readable medium is a CD ROM.

18. The method of step 14, wherein the computer readable medium is a DVD disk.

* * * * *